US009487082B2

(12) United States Patent
Lynas et al.

(10) Patent No.: US 9,487,082 B2
(45) Date of Patent: Nov. 8, 2016

(54) AIRCRAFT FUEL TANK SYSTEM

(75) Inventors: Christopher Lynas, Bristol (GB); Peter William James, Bristol (GB); Keith Macgregor, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 1178 days.

(21) Appl. No.: 12/870,343

(22) Filed: Aug. 27, 2010

(65) Prior Publication Data

US 2011/0056972 A1   Mar. 10, 2011

(30) Foreign Application Priority Data

Sep. 4, 2009   (GB) .................................. 0915363.6
Apr. 29, 2010  (GB) .................................. 1007162.9

(51) Int. Cl.
*B64G 1/00*    (2006.01)
*B60K 15/035*  (2006.01)
*B64D 37/10*   (2006.01)
*B64D 37/32*   (2006.01)

(52) U.S. Cl.
CPC ............ *B60K 15/035* (2013.01); *B64D 37/10* (2013.01); *B64D 37/32* (2013.01); *B64D 2700/62447* (2013.01)

(58) Field of Classification Search
CPC ....... B65D 90/34; F16K 17/19; F16K 17/00; F16K 24/04; F16K 17/16; A62C 4/00; F28F 9/0231
USPC ............ 123/516; 137/15.1, 587; 220/560.04, 220/562, 745, 746; 244/135 R
See application file for complete search history.

(56) References Cited

U.S. PATENT DOCUMENTS 1,438,376 A * 12/1922 Edward ........................ 220/314
6,216,791 B1   4/2001 Alhamad

FOREIGN PATENT DOCUMENTS

EP  1591359 A1  11/2005
GB  2008521 A   6/1979

OTHER PUBLICATIONS

Search Report for GB0915363.6 issued Dec. 31, 2009.
Search Report for GB1007162.9 issued Aug. 11, 2010.

* cited by examiner

*Primary Examiner* — Fenn Mathew
*Assistant Examiner* — Kevin Castillo
(74) *Attorney, Agent, or Firm* — Hauptman Ham, LLP

(57) ABSTRACT

An aircraft fuel tank system is disclosed in which a vent tank is provided with an ullage vent for use in combination with an eternal flamer barrier means during a refuelling process.

14 Claims, 6 Drawing Sheets

AIRCRAFT FUEL TANK SYSTEM

RELATED APPLICATIONS

The present application is based on, and claims priority from, Great Britain Application Numbers 0915363.6, filed Sep. 4, 2009, and 1007162.9, filed Apr. 29, 2010 the disclosures of which is hereby incorporated by reference herein in their entirety.

FIELD OF INVENTION

The present invention relates to an aircraft fuel tank system.

BACKGROUND OF THE INVENTION

Fuel tank systems for aircraft commonly comprise one or more fuel tanks and a vent tank. The vent tank may also be referred to as a surge tank. The vent tank is arranged to provide venting means to vent the fuel tanks to atmosphere. Vent tanks are arranged to allow air to flow from atmosphere into the fuel tanks as they are drained and to allow air, fuel vapour or inerting gasses or a mixture of these to flow out of the tanks to atmosphere as the tanks are filled. In addition, during such fill or drain operations, vent tanks are also commonly required to equalize pressures in normal operation due to ambient pressure changes.

Vent tanks are commonly arranged with a predetermined liquid fuel storage capacity. This capacity provides storage for liquid fuel forced from the fuel tanks and vent system into the vent tank, for example, as a result of an aircraft manoeuvre or overfilling of the fuel tanks during refuelling of the aircraft. While vent tanks are commonly arranged with means for returning such surges of fuel to the fuel tanks in a controlled manner, if the liquid fuel capacity of the vent tank is exceeded the fuel is vented to atmosphere.

One problem with such surges of liquid fuel is that they may be at a relatively high pressure during filling. If such pressure is not properly vented then the fuel tank system may be physically damaged. This is a particular problem if the fuel tank system comprises an integral part of the aircraft structure. The problem may be exacerbated when fuel is cold and thus more viscous and therefore more resistant to flow through the venting system.

Another problem exists in that fuel storage space in an aircraft is limited and valuable. Vent tanks may be located in areas that are not suitable for fuel storage and generally need to be as space efficient as possible while providing the required vent capacity. For example, vent tanks are commonly located in the wing tips of an aircraft where space, particularly depth, is restricted.

SUMMARY OF THE INVENTION

In accordance with an embodiment of the invention there is provided an aircraft fuel tank system comprising:
a vent tank comprising an ullage vent means and an inlet from one or more fuel tanks;
a vent pipe arranged to provide fluid communication between the ullage of the vent tank and the ullage vent means;
flame barrier means operable between a closed state in which the flame barrier means is arranged as a barrier to flame fronts entering the vent tank via the vent pipe and an open state in which the flame barrier means is arranged so as to enable fluid flow between the ullage and the ullage vent means to bypass the flame barrier means;
coupling means arranged for sealingly externally coupling an external flame barrier means to the ullage vent so as to provide fluid communication between the vent pipe and atmosphere via a coupled external flame barrier means; and
actuator means arranged to operate the flame barrier means into the open state in response to the coupling of an external flame barrier means via the coupling means, the actuator means being further operable to operate the flame barrier means into the closed state in response to the decoupling of the external flame barrier means from the coupling means.

The actuator means may be at least partially manually operable by the coupling movement of an external flame barrier means with the coupling means. The actuator means may be at least partially powered. The actuator means may comprises first locking means arranged to prevent removal of an external flame barrier means from the coupling means until the flame barrier means is returned to the closed state. The actuator means may comprise second locking means arranged to lock the flame barrier means in the closed state, the second lock being operable to release the flame barrier means in response to the engagement of an external flame barrier means with the coupling means. The flame barrier means may be arranged to rotate at least partially within the vent pipe so as to switch between the open and closed states. The flame barrier means is arranged to translate to a position at least partially outside the vent pipe general cross-section so as to switch between the closed to the open state.

The flame barrier means may be positioned substantially outside the general cross-section of the vent pipe in the open state. The flame barrier means may be positioned substantially inside the general cross-section of the vent pipe in the open state. The vent pipe may comprise a first section having a cross-section sealingly conforming to the flame barrier means in the closed state and a second section having a larger cross section than the flame barrier means so that translation of the flame barrier means to an open state positioned within the second section so as to enable the fluid flow between the ullage and the ullage vent means to bypass the flame barrier means. The flame barrier means comprises one or more valved bypass conduits operable to enable the fluid flow between the ullage and the ullage vent means to bypass the flame barrier means. The flame barrier means may be biased into the closed state. One or more seals 309 extend outwardly from the flame barrier means and may be positioned between the flame barrier means in the closed state and the vent pipe. One or more seats may be positioned within the vent pipe for seating the flame barrier means in the closed state.

Another embodiment provides an external flame barrier means for use with the aircraft fuel tank system of any preceding claim, the external flame barrier means comprising:
a hollow body member comprising a first port providing coupling means for sealing engagement with the coupling means of the aircraft fuel tank system and a second port providing a vent to atmosphere; and
flame barrier means arranged within the body member so as to provide a barrier to ingress past the first port of a flame front external to the external flame barrier means and to enable egress of liquid fuel from the first port to atmosphere.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
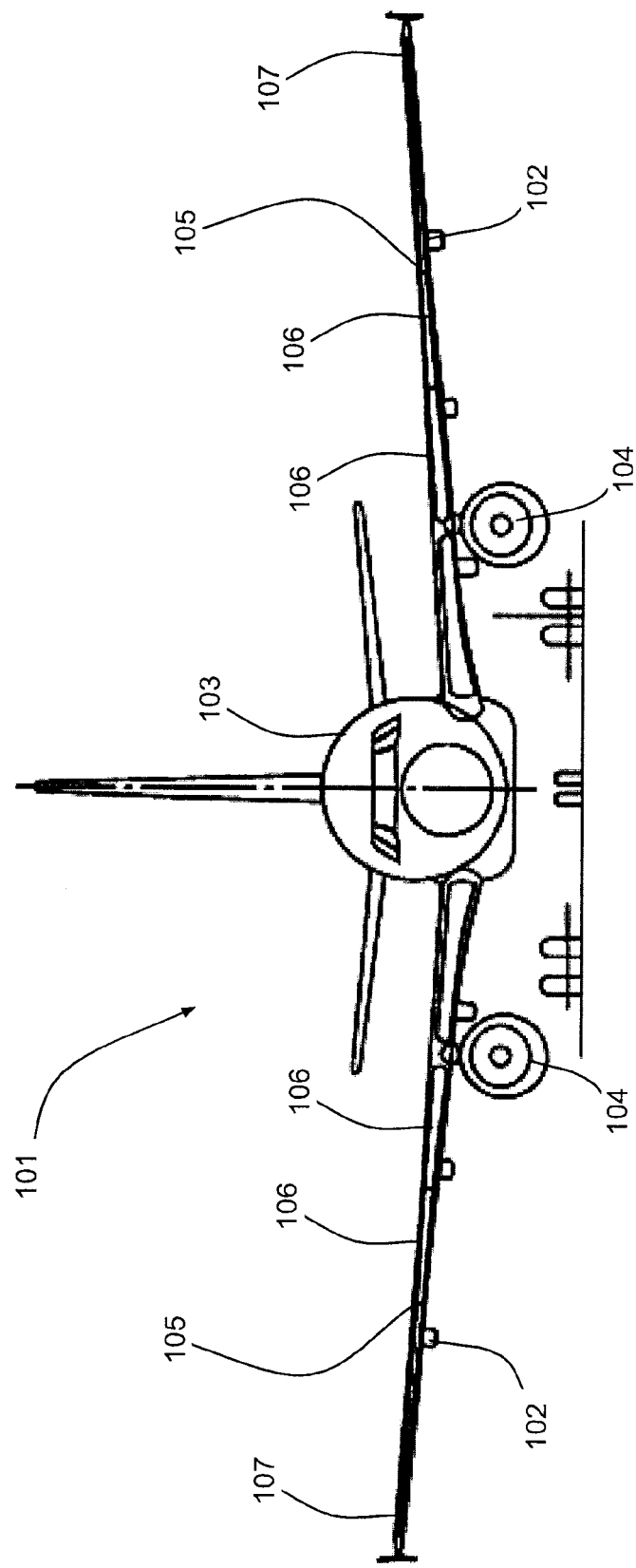
FIG. 1 is a schematic front view of an aircraft.

With reference to FIG. 1, an aircraft 101 comprises a pair of wings 102 faired into a fuselage 103. Each wing 102 carries an engine 104 and part of an internally located fuel tank system 105. The fuel tank system 105 provides fuel to the engines 104. The fuel tank system comprises a set of fuel tanks 106 and two vent tanks 107 each built-in to a respective wing 102. The vent tanks 107 are each located towards the tip of their respective wings 102. The vent tanks 107 are arranged to perform a number of functions. Firstly, the vent tanks 107 vent the ullage of each of the fuel tanks 106 to atmosphere to enable the ingress of air required to equalise negative pressure in the fuel tanks as a result of, for example, fuel being burned by the engines 104 or a decrease in altitude of the aircraft 101. Secondly, the vent tanks 107 vent the ullage of each of the fuel tanks 106 to atmosphere to enable the egress of positive pressure of air, fuel vapour or inerting gasses from the tanks as a result, for example, of an increase in ambient temperature or altitude of the aircraft 101. Thirdly, the vent tanks 107 are arranged to vent excess liquid fuel from the fuel tanks 106 to atmosphere as a result of, for example, exceptional manoeuvres of the aircraft 101 or by overfilling of the fuel tanks 106 during a refuelling process.

Figure 2:
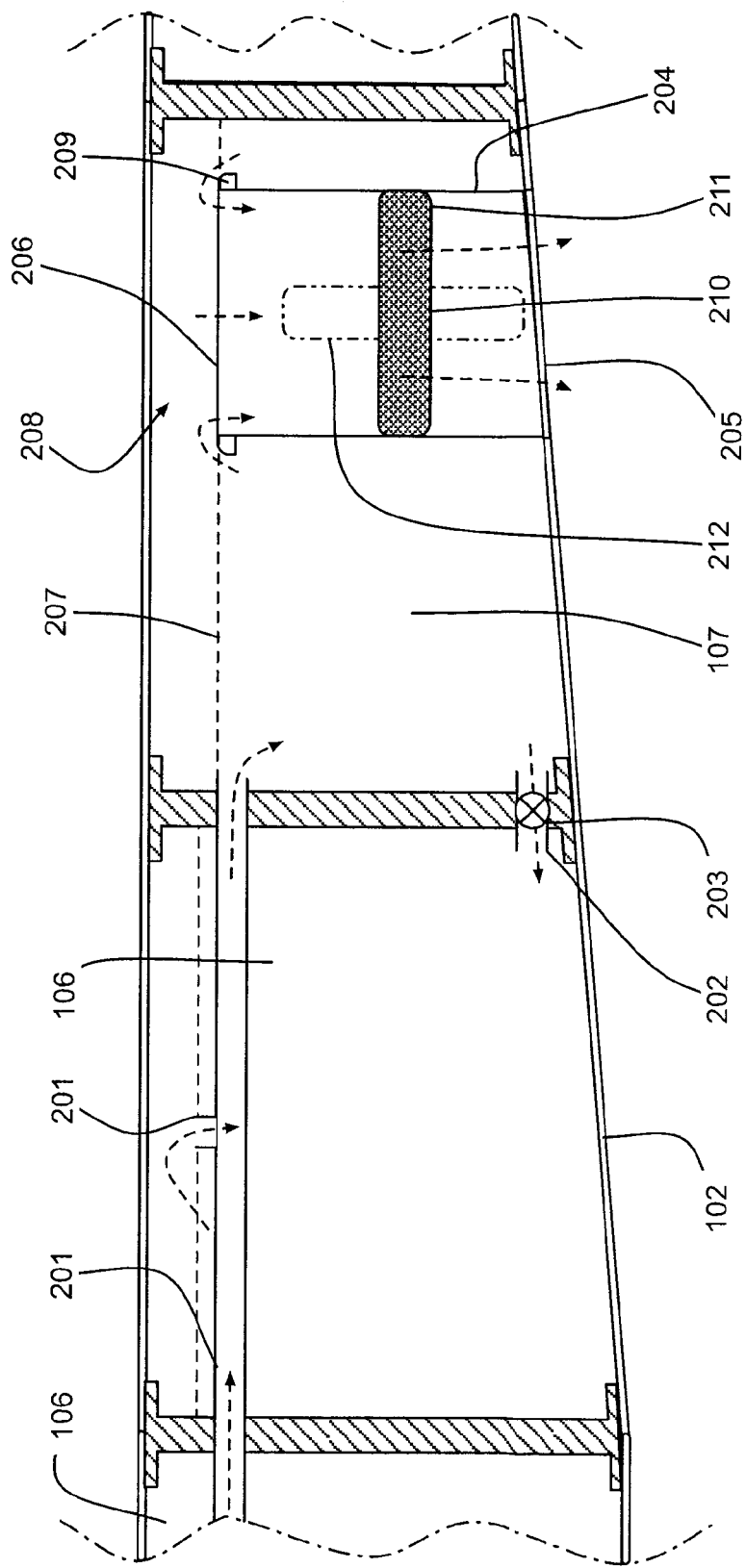
FIG. 2 is a cross-sectional front view of a vent tank in the fuel tank system of the aircraft of FIG. 1.

With reference to FIG. 2, in the present embodiment two fuel tanks 106 and the vent tank 107 are provided by the internal structure of each of the wings 102. The fuel tanks 106 are arranged with a ventilation system comprising a first set of conduits 201 for venting the ullage of each respective fuel tank 106 into the vent tank 107. The fuel and vent tanks 106, 107 are further provided with a fuel return system comprising a second set of conduits 202 controlled by pumps 203 having non-return valves that enable the controlled return of fuel from the vent tank 107 to the fuel tanks 106.

The vent tank 107 further comprises a vent pipe 204 arranged to provide fluid communication between the interior of the vent tank 107 and atmosphere via an ullage vent 205 positioned in the lower wall of the ullage tank 107 and the aircraft wing 102. In the present embodiment, the vent pipe 204 is cylindrical and arranged vertically within the vent tank 107 when the aircraft 101 is level. The vent pipe 204 has its lower open end in direct fluid communication with the ullage vent 205. In the present embodiment, the position of the upper open end 206 of the vent pipe 204 defines the maximum designed liquid fuel level 207 of the vent tank 107. The space in the vent tank 107 above the maximum designed fuel level 207 is the minimal ullage 208. In the present embodiment, the upper end 206 of the vent pipe 204 is provided with a lip 209.

The vent pipe 204 further comprises a flame barrier means 210 arranged to prevent an external flame front from entering the vent tank 107 via the ullage vent 205 and the vent pipe 204. In the present embodiment, the flame barrier means 210 is operable between two positions or states 211, 212. In the first position 211, as shown in FIG. 2, the flame barrier means 210 is in a closed state, that is, the flame barrier means 210 is arranged as a barrier to flame fronts entering the vent tank 107 via said vent pipe 204. In the second position 212, as indicated by a broken outline in FIG. 2, the flame barrier means 210 is in an open state, that is, the flame barrier means 210 is arranged so as to enable fluid flow between the ullage 208 and the ullage vent means 205 to circumvent or bypass the flame barrier means 210. In the present embodiment, the flame barrier means 210 is arranged so as to be only operable to the open state 212 when an additional external flame barrier means (not shown in FIG. 2) is connected to the ullage vent 205 as described in further detail below.

Figure 3:
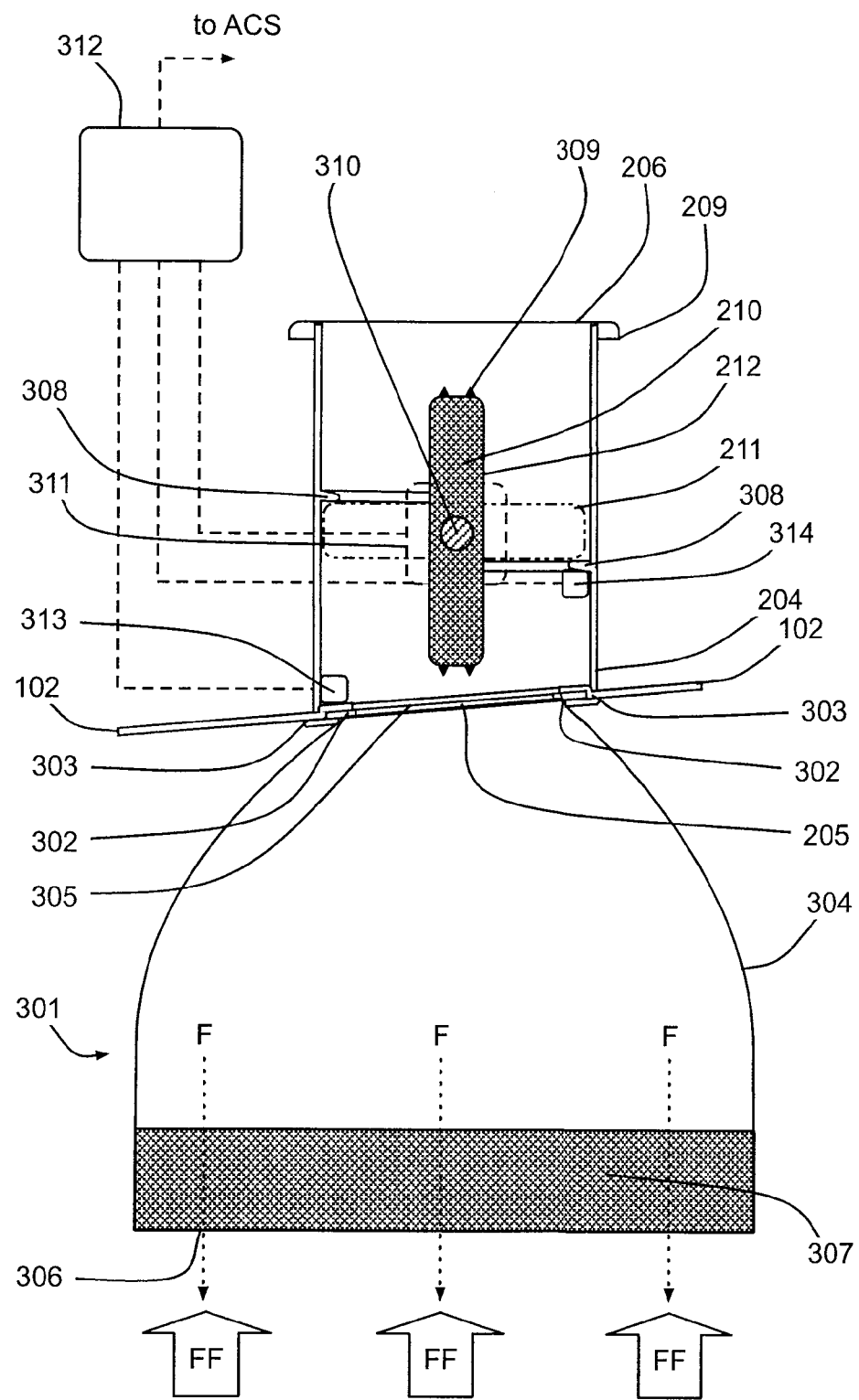
FIG. 3 is a schematic cross-sectional view of the vent pipe in the vent tank of FIG. 2 in combination with an external flame barrier means.

Thus, the vent tanks 107 are arranged for use in two modes. The first mode is provided for venting of the vent tanks 107 when no external flame arrestor is in place. In this first mode, the flame barrier means 210 is in its closed state 211 and all venting of the vent tank 107 is provided via the vent pipe 204, flame barrier means 210 and the ullage vent 205. The second mode is provided for venting of the vent tanks 107 during a refuelling process with an external flame arrestor. In this second mode, with reference to FIG. 3, an external flame barrier means 301 is coupled to the ullage vent 205 and the flame barrier means 210 is placed in its open state 212 as shown in FIG. 3. The coupling between the ullage vent 205 and the external flame barrier means 301 is provided by male coupling means 302 formed on the external flame barrier means 301 and complimentary female coupling means 303 formed in the ullage vent 205 and provides a fluid seal between the coupled parts.

The external flame barrier means 301 further comprises a hollow substantially cylindrical body member 304 having a first and second open ends 305, 306. The first open end 305 is arranged to conform to the ullage vent 205 and carries the male coupling means 302 in the from a male part of a bayonet coupling. The ullage vent 205 provides the complimentary female part of the bayonet coupling. The second open end 306 is open to atmosphere. The external flame barrier means 301 further comprises a flame barrier element 307 fixed within the body member 304. The flame barrier element is arranged to provide a flame barrier for preventing ingress, via the external flame barrier means 301, of a flame front (FF) external to the vent tank 107 while allowing egress (F) of fuel, fuel vapour or other liquids or gasses to atmosphere.

In the present embodiment, the flame barrier means 210 and flame barrier element 307 are formed from a conventional flame barrier material such as layered wire mesh. As will be understood by those in the art, the flame barrier may be formed from any suitable material such as non-woven meshes or may comprise one or more granular or particulate layers.

In the present embodiment, the flame barrier means 210 is provided with a set of circumferential seals 309 located around the flame barrier means 210 so as to provide a seal between the flame barrier means 210 and the interior surface of the vent pipe 204 when the flame barrier means 210 is in the closed state 211. In addition, the interior wall of the vent pipe 204 is provided with a seat 308 for the flame barrier means 210 in its closed state 211. The seat 309 is arranged so as to provide positive location of the flame barrier means 210 in its closed position 211. The flame barrier means 210 is fixedly mounted within the vent pipe 204 on a drive shaft 310 positioned perpendicular to the central axis of the vent pipe 204. The drive shaft 310 is rotatably, sealingly mounted in the wall of the vent pipe 204.

In the present embodiment, one end of the drive shaft 310 is coupled to an actuator 311 mounted adjacent the vent pipe 204. The actuator 311 is arranged to drive the drive shaft 310 so as to move the flame barrier means 210 between its open and closed states 212, 211. The actuator 311 is connected to a controller 312 and a two clusters of sensors and locks 313, 314. The controller 312 controls the operation of the actuator 311, taking into account inputs from the sensors and locks 313, 314. The first sensor and lock cluster 313 is positioned adjacent the female coupling means 303 formed in the ullage vent 205. The first sensor and lock cluster 313 is arranged to detect whether or not an external flame barrier means 301 is engaged with the ullage vent 205 and to provide this data to the controller 312. The first sensor and lock cluster 313 is further arranged, under the control of the controller 312, to lock an engaged external flame barrier means 301 within the coupling means 302, 303. The second sensor and lock cluster 314 is positioned adjacent the seat 308 and arranged to detect whether or not the flame barrier means 210 is seated in the seat 308 in its closed state 211. The first sensor and lock cluster 313 is further arranged, under the control of the controller 312, to lock the flame barrier means 210 in its closed state 211. In addition to communications means, in the form of wiring, with the actuator 311 and sensor/lock clusters 313, 314, the controller 312 further comprises a communications link with the aircraft control systems (ACS) for communicating data such as fault data or state data from the sensor/lock clusters 313, 314 and for providing external control or override facilities.

Figure 4:
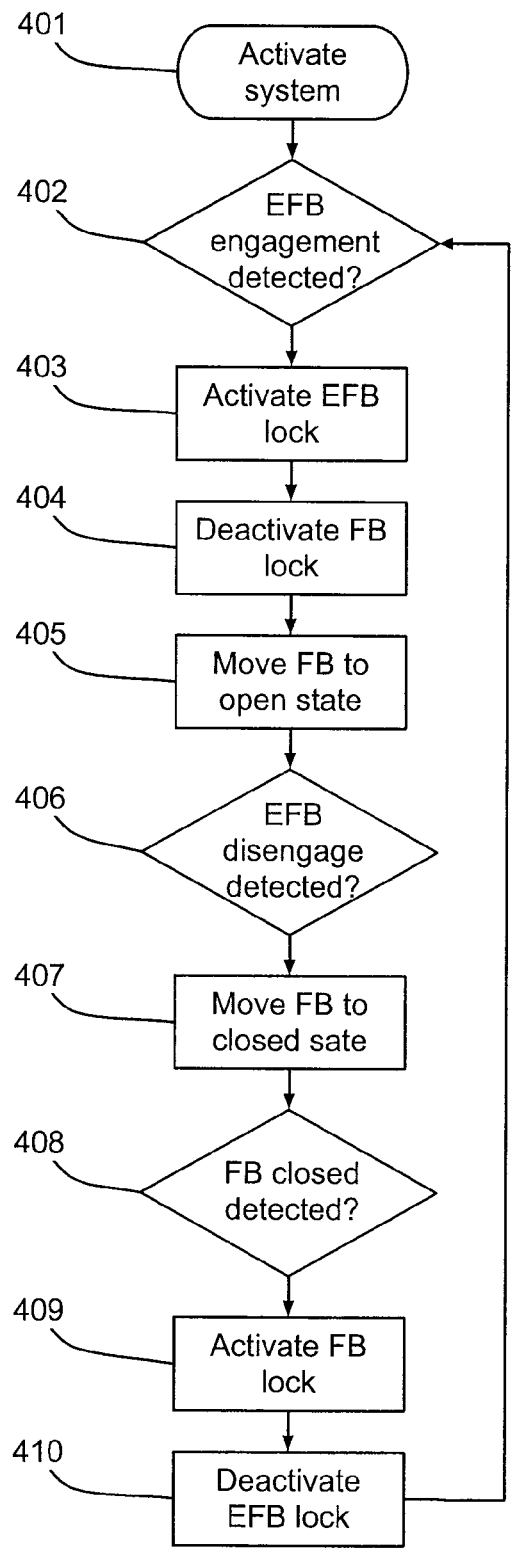
FIG. 4 is a flow chart illustrating the processing performed by an actuator control system in the vent pipe of FIG. 2.

In the present embodiment, the controller 312 comprises a programmable electronic device programmed so as to perform the relevant functions. The processing performed by the controller 312 when operating the flame barrier means 210 between its closed and open states 211, 212 will now be described in further detail with reference to the flow chart of FIG. 4. At step 401, processing is initiated on start-up of the aircraft systems and moves to step 402. At step 402, input from the first sensor/lock cluster 313 is awaited that indicates that an external flame barrier (EFB) means 301 is engaged in the ullage vent 205. Once such input is received processing moves to step 403. At step 403, the lock is activated in the first sensor/lock cluster 313 so as to lock the external flame barrier (EFB) means 301 in the ullage vent 205 and processing moves to step 404. At step 404 the lock in the second sensor/lock cluster 314 is deactivated to enable movement of the flame barrier means 210 from the closed position 211 and processing moves to step 405. At step 405, the actuator 311 is operated so as to move the flame barrier means 210 from its closed state 211 to its open state 212 and processing moves to step 406.

At step 406, input from the first sensor/lock cluster 313 is awaited indicating disengagement of the external flame barrier means 301 and once received processing moves to step 407. At step 407, the actuator 311 is operated so as to move the flame barrier means 210 from its open state 212 to its closed state 211 and processing moves to step 408. At step 408, input from the second sensor/lock cluster 314 is awaited indicating that the flame barrier means 210 is in its closed state 211 and once received processing moves to step 409. At step 409, the lock of the second sensor/lock cluster 314 is activated to lock the flame barrier means 210 is in its closed state 211 and processing moves to step 410. At step 410, the lock of the first sensor/lock cluster 313 is deactivated to as to enable full disengagement of the external flame barrier means 301 from the ullage vent 205. Processing then returns to step 402 and proceeds as described above.

As will be understood by those skilled in the art, coupling between the ullage vent 205 and the external flame barrier means 301 is arranged to maintain its fluid seal between the coupled parts while fully coupled and during at least the initial stage of the uncoupling movement until the further uncoupling of the external flame barrier means 301 is stopped by the first lock 313. This enables the disengagement of the external flame barrier means 301 to be detected and the flame barrier means 210 to be moved to its closed position 211 prior to the fluid seal being broken and the external flame barrier means 301 being fully disengaged from the ullage vent 205.

Figure 5:
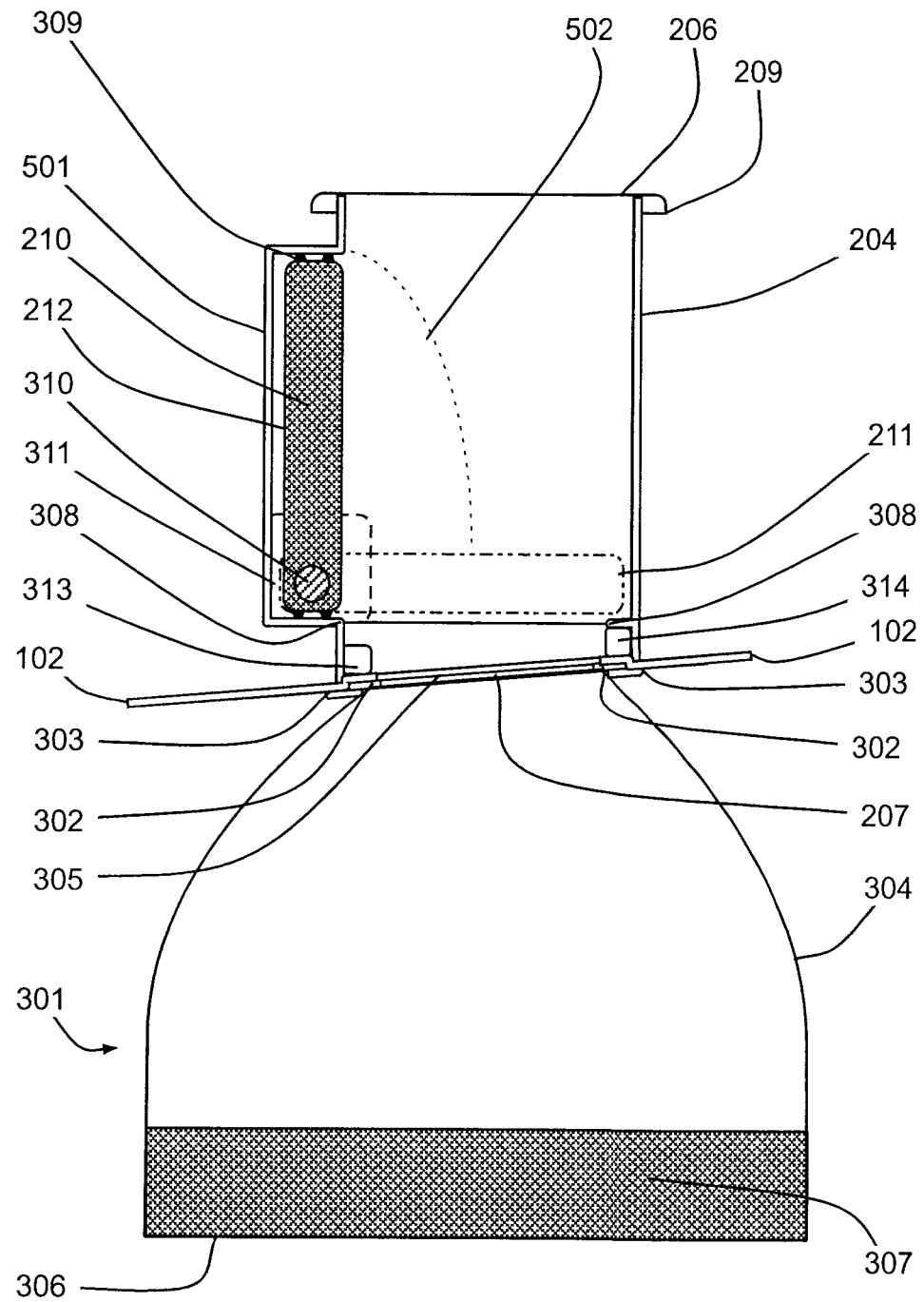
FIGS. 5 & 6 are schematic cross-sectional views of the vent pipes in accordance with further embodiments for use in a vent tank in combination with an external flame barrier means.

In another embodiment, with reference to FIG. 5, a recess 501 is provided in the wall of the vent pipe 204. The recess is proportioned so as to enable the flame barrier means 210 to fit substantially within it in its open state 212. In the present embodiment, the shaft 310 is arranged to one side of the vent pipe 204 so that the flame barrier means 210 is arranged to rotate upwardly about its edge from its closed position 211 abutting the seat 308, into its open position 212 substantially within the recess 501. The vent pipe 204 is also provided with a widened portion 502 to accommodate the movement of the substantially disc-shaped flame barrier means 210 between its open and closed states 212, 211.

Figure 6:
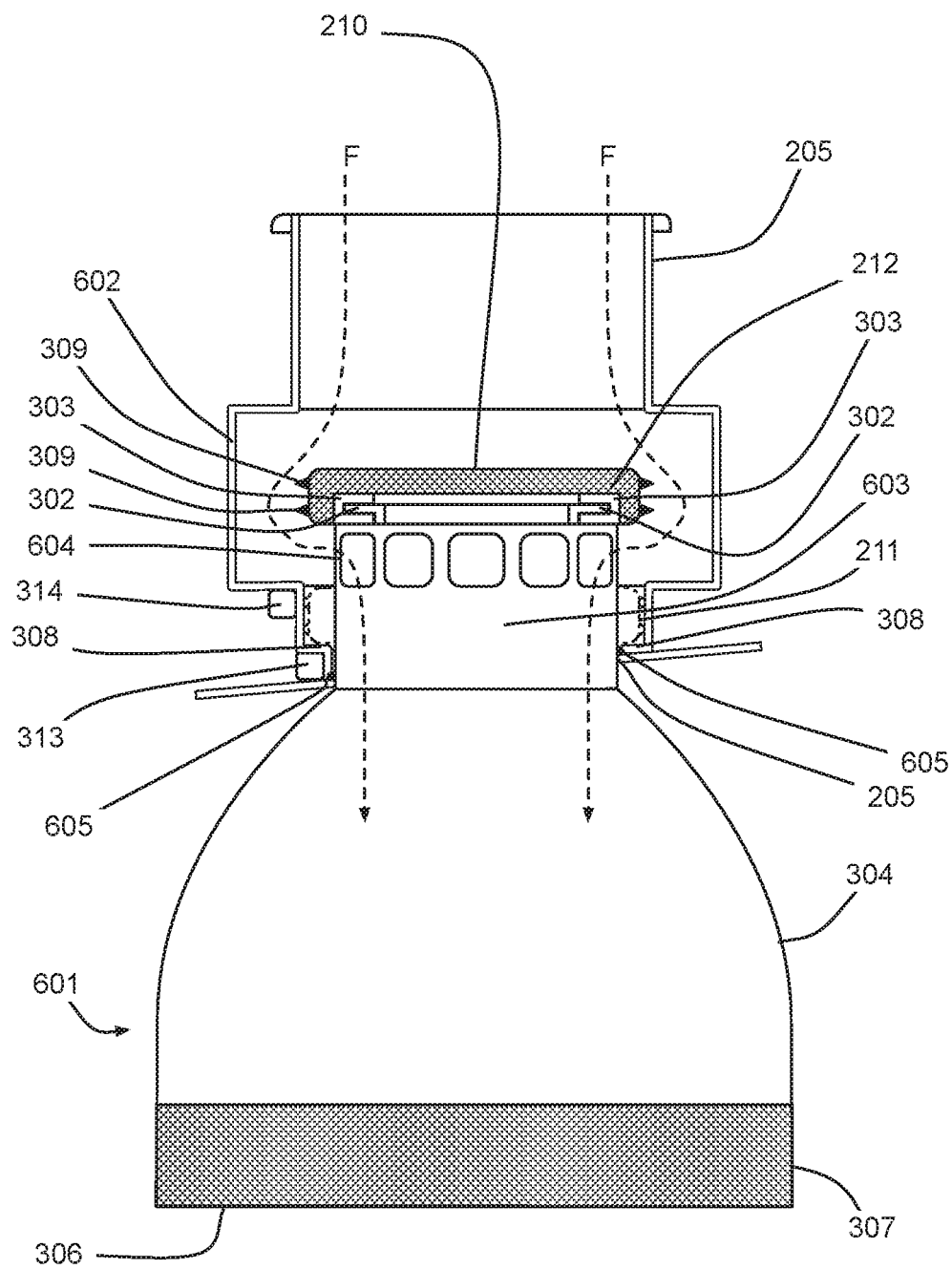

In a further embodiment, with reference to FIG. 6, the flame barrier means 210 is arranged to be lifted manually from its closed state 211 into its open state 212 by the engagement of an external flame barrier means 601. In its closed position 211, the flame barrier means 210 is sealingly located in its seat 308. In its open position 212, the flame barrier means 210 is lifted by the external flame barrier means 601 into a widened portion 602 of the vent pipe 204 which provides a conduit for fluid flow around the flame barrier means 210. In the present embodiment, the external flame barrier means 601 comprises an extended cylindrical neck 603 between the male coupling means 302 on its upper open end 305 and the body member 304. The upper end of the cylindrical neck 603 is provided with a plurality of ports 604 that provide fluid communication F between the exterior and interior of the external flame barrier means 601.

In the present embodiment, the ullage vent 205 is provided with a seal 605 in its interior surface. The seal 605 is arranged to provide a fluid seal between the ullage vent 205 and the neck 603 during insertion of the external flame barrier means 601. Furthermore, the extent of the ports 604 in the direction of insertion of the external flame barrier means 601 is limited so that when the external flame barrier means 601 is inserted, the whole of each port 604 moves interior to the seal 605 prior to the flame barrier means 210 being lifted out of sealing engagement with its seat 308. In other words, the vertical extent of the ports 604 is limited so as to avoid the risk of providing a path for a flame fronts to pass into the vent tank 107 during insertion of the external flame barrier means 601.

In the present embodiment, the upper end of the external flame barrier means 601 and the underside of the flame barrier means 210 comprise complimentary elements of a coupling means (not show). Coupling of the flame barrier means 210, 601 is detected by the sensor of the first sensor/lock cluster 311. Such detection results in the deactivation of the corresponding lock of the second sensor/lock cluster 311 that is operable to lock the flame barrier means 210 in its closed state 211. The external flame barrier means 601 is then operable to move upwardly so as to lift the attached flame barrier means 210 into its open state 212 at which point the lock of the first sensor/lock cluster 311 locks the external flame barrier means 601 into its fully engaged position. The removal process for the external flame barrier means 601 is the reverse of the insertion procedure. The removal procedure is initiated by the manual release of the lock of the first sensor/lock cluster 311 and results in the flame barrier element 210 being retuned and locked into its closed position 211.

As will be understood by those skilled in the art, the powered or mechanical elements of the embodiments described above may be wholly or partially substituted for any other mechanical or powered mechanism for providing the same function. Actuation may be provided by any suitable combination of suitable methods such as manual, electric hydraulic power. The mechanism may be arranged for control either partially or fully automatically or may be partially or fully manually controlled by ground or onboard personnel. As will be understood by those skilled in the art, the sensors and locks may be provided as separate elements. The arrangement of sensors and locks provided may be varied to suit a given powering, actuation or control variation as described above.

As will be understood by those skilled in the art, in any of the embodiments described herein, an intermediate conduit such as a hose or pipe may be provided between the ullage vent and the external flame barrier means so as to conduct any liquid fuel flowing from the ullage vent away from the aircraft structure. As will be understood by those skilled in the art, the hatch for the ullage vent may be provided with further locking or retaining means to prevent accidental or unauthorised opening.

The external flame barrier means in combination with the ullage vent and vent pipe may be arranged so as to provide comparable or greater fluid flow than a given refuelling means/pump. This arrangement will reduce the risk of the refuelling pump increasing the pressure within the fuel tank system beyond its structural limits and thus avoid damage to the aircraft structure. The external flame barrier means may be arranged for use during high rate refueling, whereas during lower pressure or standard refueling operations only the internal flame barrier means may be utilized.

As will be understood by those skilled in the art, the coupling means between the external flame barrier means and the ullage vent may be provided by any suitable coupling means such as correspondingly threaded male and female members, push or snap-fit connectors or any other coupling means suitable for carrying fuel.

As will be understood by those skilled in the art, the ullage vent may be provided with an ice screen.

As will be understood by those in the art, any surface of one or more of the flame barrier elements may be corrugated or be formed with a convoluted cross section. Such corrugations or convolutions may run in any suitable direction through the flame barrier elements. For example, the corrugations or convolutions may run radially or circumferentially relative to the central axis of the corresponding external flame barrier means.

As will be understood by those in the art, the ullage vent may be fed by or feed into an aerodynamic duct, such as a NACA (National Advisory Committee for Aeronautics) duct or the like, for providing an aerodynamic interface between the ullage vent and the external surface of the aircraft.

Embodiments of the invention may enable the vent pipe and flame barrier arrangements to be more compact since the vent pipe need only be capable of the relatively low flow rates required when the aircraft is operating in modes other than the refuelling mode.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the applicant's general inventive concept.

The invention claimed is:

1. An aircraft fuel tank system, comprising:
    one or more aircraft fuel tanks holding and supplying aircraft fuel to aircraft engines within said aircraft;
    an aircraft surge tank comprising an ullage vent and an inlet from the one or more aircraft fuel tanks;
    a vent pipe arranged to provide fluid communication between the ullage of said aircraft surge tank and said ullage vent;
    a flame barrier operable between a closed state in which said flame barrier is arranged as a barrier to flame fronts entering said aircraft surge tank via said aircraft vent pipe and an open state in which said flame barrier is arranged so as to enable fluid flow between said ullage and said ullage vent to bypass said flame barrier means;
    a coupling mechanism sealingly externally coupling an external flame barrier to said ullage vent so as to provide fluid communication between said aircraft vent pipe and atmosphere via the coupled external flame barrier; and
    an actuator arranged to operate said flame barrier into said open state in response to the coupling of an external flame barrier via said coupling, said actuator being further operable to operate said flame barrier into said closed state in response to the decoupling of said external flame barrier from said coupling.

2. An aircraft fuel tank system according to claim 1 in which said actuator is at least partially manually operable by the coupling movement of the external flame barrier with said coupling mechanism.

3. An aircraft fuel tank system according to claim 1 in which said actuator is partially powered.

4. An aircraft fuel tank system according to claim 1 in which said actuator means comprises first locking means arranged to prevent removal of an external flame barrier means from said coupling means until said flame barrier means is returned to said closed state.

5. An aircraft fuel tank system according to claim 1 in which said actuator means comprises second locking means arranged to lock said flame barrier means in said closed state, said second lock being operable to release said flame barrier means in response to the engagement of an external flame barrier means with said coupling means.

6. An aircraft fuel tank system according to claim 1 in which said flame barrier means is arranged to rotate within said vent pipe so as to switch between said open and closed states.

7. An aircraft fuel tank system according to claim 1 in which said flame barrier means is arranged to translate to a position outside a cross-section of said vent-pipe so as to switch between said closed to said open state.

8. An aircraft fuel tank system according to claim 1 in which said flame barrier means is positioned substantially outside a general cross-section of said vent pipe in said open state.

9. An aircraft fuel tank system according to claim 1 in which said flame barrier means is positioned substantially inside a general cross-section of said vent pipe in said open state.

10. An aircraft fuel tank system according to claim 1 in which said vent pipe comprises a first section having a cross-section sealingly conforming to said flame barrier means in said closed state and a second section having a larger cross section than said flame barrier means so that translation of said flame barrier means to an open state positioned within said second section so as to enable said fluid flow between said ullage and said ullage vent means to bypass said flame barrier means.

11. An aircraft fuel tank system according to claim 1 in which said flame barrier means creates bypass conduits operable to enable said fluid flow between said ullage and said ullage vent to bypass said flame barrier means.

12. An aircraft fuel tank system according to claim 1 in which said flame barrier is biased into said closed state.

13. An aircraft fuel tank system according to claim 1 further comprising one or more seals positioned between said flame barrier in said closed state and an inner wall of said vent pipe.

14. An aircraft fuel tank system according to claim 1 further comprising at least one seat positioned within said vent pipe for seating said flame barrier means in said closed state.

\* \* \* \* \*